(12) United States Patent
Chen et al.

(10) Patent No.: US 12,264,102 B2
(45) Date of Patent: Apr. 1, 2025

(54) METHOD FOR PRODUCING PHOTOCATALYTIC MORTAR

(71) Applicant: NATIONAL CHUNG CHENG UNIVERSITY, Minsyong Township, Chiayi County (TW)

(72) Inventors: Chien-Yen Chen, Minsyong Township, Chiayi County (TW); Yi-Hsun Huang, Minsyong Township, Chiayi County (TW); Pin-Yun Lin, Minsyong Township, Chiayi County (TW); Wei-Fan Ye, Minsyong Township, Chiayi County (TW)

(73) Assignee: NATIONAL CHUNG CHENG UNIVERSITY, Minsyong Township (TW)

( * ) Notice: Subject to any disclaimer, the term of this patent is extended or adjusted under 35 U.S.C. 154(b) by 549 days.

(21) Appl. No.: 17/707,211

(22) Filed: Mar. 29, 2022

(65) Prior Publication Data

US 2023/0022594 A1 Jan. 26, 2023
US 2023/0399262 A9 Dec. 14, 2023

(30) Foreign Application Priority Data

Jul. 16, 2021 (TW) ................. 110126277

(51) Int. Cl.

| C04B 22/06 | (2006.01) |
|---|---|
| B01J 23/06 | (2006.01) |
| B01J 35/39 | (2024.01) |
| B01J 37/36 | (2006.01) |
| C04B 14/06 | (2006.01) |
| C04B 24/14 | (2006.01) |
| C04B 28/24 | (2006.01) |
| C04B 103/00 | (2006.01) |
| C04B 111/00 | (2006.01) |

(52) U.S. Cl.
CPC ............... *C04B 22/06* (2013.01); *B01J 23/06* (2013.01); *B01J 35/39* (2024.01); *B01J 37/36* (2013.01); *C04B 14/06* (2013.01); *C04B 24/14* (2013.01); *C04B 28/24* (2013.01); *C04B 2103/0001* (2013.01); *C04B 2103/0067* (2013.01); *C04B 2111/00827* (2013.01)

(58) Field of Classification Search
CPC .. B01J 35/39; B01J 23/06; B01J 37/36; C04B 22/06; C04B 14/06; C04B 24/14; C04B 28/24; C04B 2103/0001; C04B 2103/0067; C04B 2111/00827
USPC ...... 502/7, 343; 423/622; 106/635, 733, 419
See application file for complete search history.

(56) References Cited

U.S. PATENT DOCUMENTS

| 1,793,350 | A | * | 2/1931 | Bader | .................. C07C 29/153 502/343 |
|---|---|---|---|---|---|
| 2018/0185894 | A1 | * | 7/2018 | Burbank | .................. C12P 3/00 |
| 2024/0336527 | A1 | * | 10/2024 | Smith | ....................... C12P 3/00 |

OTHER PUBLICATIONS

Suyu Qiao et al., "Multiple heavy metals immobilization based on microbially induced carbonate precipitation by ureolytic bacteria and the precipitation patterns exploration." Chemosphere 271, pp. 1-13. (Year: 2021).*

Shakeel Ahmed et al., "A review on biogenic synthesis of ZnO nanoparticles using plant extracts and microbes: A prospect towards green chemistry." Journal of Photochemistry % Photobiology, B: Biology 166, pp. 272-284. (Year: 2017).*

* cited by examiner

*Primary Examiner* — Patricia L. Hailey
(74) *Attorney, Agent, or Firm* — Michael Best & Friedrich LLP

(57) ABSTRACT

A method for producing photocatalytic mortar includes providing a mortar-producing material including a fine aggregate and cement, a reactant mixture including a zinc source and urea, and a microorganism-containing mixture including water and a urease-producing microorganism, subjecting the microorganism-containing mixture and the reactant mixture to microbial induced precipitation in the mortar-producing material, subjecting zinc carbonate crystal-containing mortar produced to curing for the same to undergo hydration, and subjecting cured mortar to hydrothermal synthesis, so that zinc carbonate crystals therein are converted to nano zinc oxide crystals.

11 Claims, 8 Drawing Sheets

Example A1

Example A2

Example A3

Example A4

Example A5

Comparative Example A

Example B1

Example B2

Example B3

Example B4

Example B5

Comparative Example B

Example C1

Example C2

Example C3

Example C4

Example C5

Comparative Example C

Example D1

Example D2

Example D3

Example D4

Example D5

Comparative Example D

METHOD FOR PRODUCING PHOTOCATALYTIC MORTAR

CROSS-REFERENCE TO RELATED APPLICATION

This application claims priority of Taiwanese Patent Application No. 110126277, filed on Jul. 16, 2021.

FIELD

The disclosure relates to a method for producing mortar, and more particularly to a method for producing mortar having photocatalytic activity.

BACKGROUND

Concrete is produced by mixing mortar and coarse aggregates, and mortar is produced by mixing cements and fine aggregates. Based on the workability requirement for concrete, concrete manufacturers may adjust the particle size of coarse aggregates and fine aggregates for concrete production. However, since the structure of concrete is built by piling of particles of coarse and fine aggregates with different sizes, the structure of concrete is fraught with gaps between the particles of the aggregates therein, such that water in the environment (e.g. moisture and rainwater) might easily penetrate into the structure of concrete through the gaps and cause dampness of the concrete. Therefore, bacteria and fungi might hence grow in the structure of concrete.

In order to solve the aforesaid problem, in producing mortar, nano zinc oxide powder is added to enhance the hydrophobicity of the mortar to be produced and to fill the gaps in the mortar to be produced, and to provide the mortar to be produced with photocatalytic activity. Thus, the concrete produced from the mortar containing nano zinc oxide powder can have lower water absorption, and is able to perform photocatalysis so as to have abilities to fight against bacteria, clean air, and degrade pollutants in the environment. However, several reports have shown that the addition of nano zinc oxide powder in mortar affects the cementation of mortar and hence adversely influence the mechanical strength of concrete. In particular, the higher the amount of nano zinc oxide powder in mortar, the lower the mechanical strength of concrete is.

SUMMARY

Therefore, an object of the disclosure is to provide a method for producing photocatalytic mortar, which can alleviate at least one of the drawbacks of the prior art.

The method includes:
providing a mortar-producing material that includes a fine aggregate and cement, a reactant mixture that includes a zinc source and urea, and a microorganism-containing mixture that includes water and a urease-producing microorganism;
subjecting the microorganism-containing mixture and the reactant mixture to microbial induced precipitation in the mortar-producing material, so as to obtain zinc carbonate crystal-containing mortar;
subjecting the zinc carbonate crystal-containing mortar to a curing process, so that the zinc carbonate crystal-containing mortar undergoes hydration to form cured mortar; and
subjecting the cured mortar to hydrothermal synthesis, so that zinc carbonate crystals in the cured mortar are converted to nano zinc oxide crystals.

BRIEF DESCRIPTION OF THE DRAWINGS

Other features and advantages of the disclosure will become apparent in the following detailed description of the embodiment(s) with reference to the accompanying drawings, of which.

DETAILED DESCRIPTION

Figure 1:
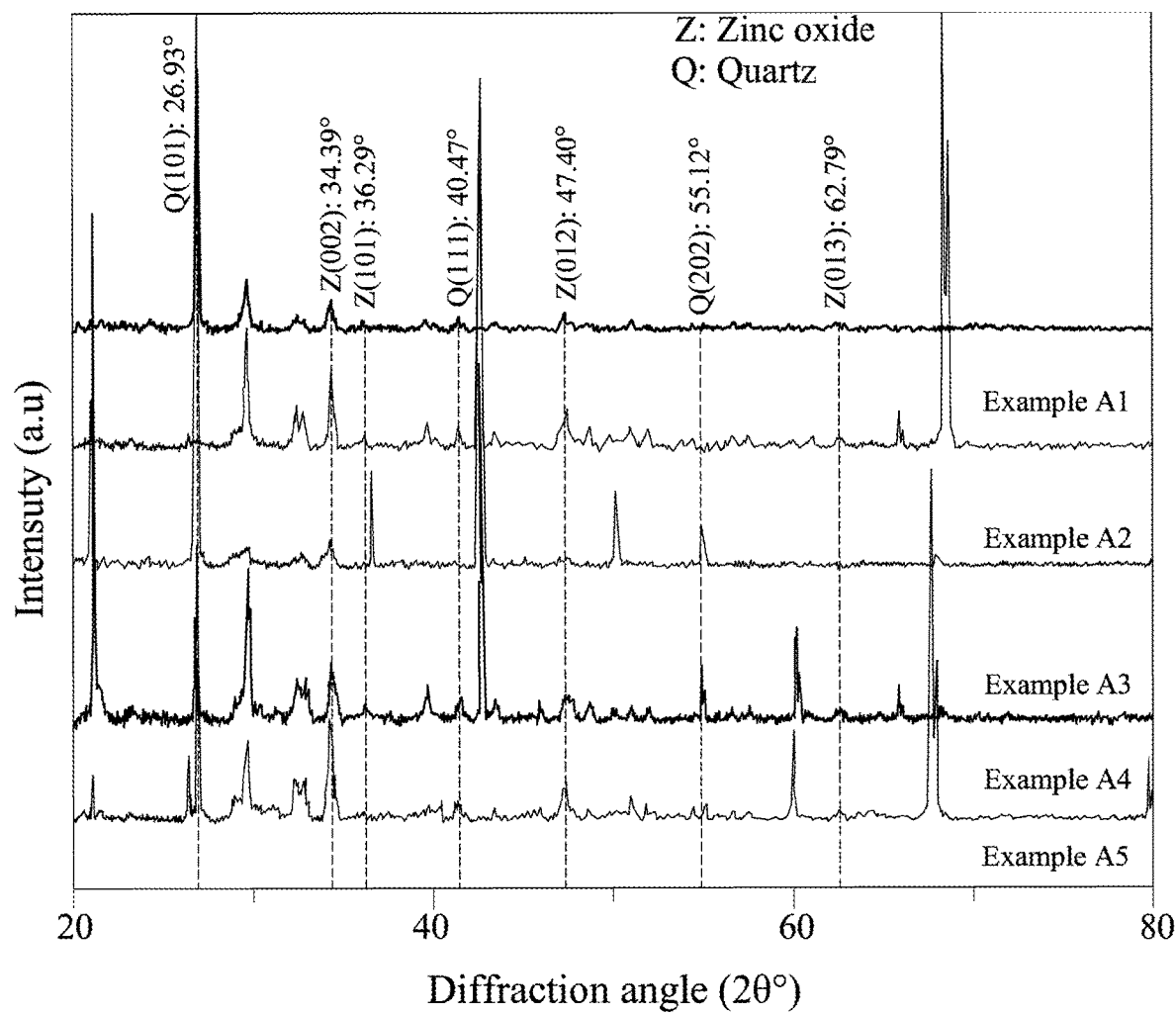
FIG. 1 shows X-ray diffractograms of photocatalytic mortar of Examples A1 to A5.

It is to be understood that, if any prior art publication is referred to herein, such reference does not constitute an admission that the publication forms a part of the common general knowledge in the art, in Taiwan or any other country.

For the purpose of this specification, it will be clearly understood that the word "comprising" means "including but not limited to", and that the word "comprises" has a corresponding meaning.

One skilled in the art will recognize many methods and materials similar or equivalent to those described herein, which could be used in the practice of this disclosure. Indeed, this disclosure is in no way limited to the methods and materials described.

The present disclosure provides a method for producing photocatalytic mortar, which includes:
providing a mortar-producing material that includes a fine aggregate and cement, a reactant mixture that includes a zinc source and urea, and a microorganism-containing mixture that includes water and a urease-producing microorganism;
subjecting the microorganism-containing mixture and the reactant mixture to microbial induced precipitation in the mortar-producing material, so as to obtain zinc carbonate crystal-containing mortar;
subjecting the zinc carbonate crystal-containing mortar to a curing process, so that the zinc carbonate crystal-containing mortar undergoes hydration to form cured mortar; and
subjecting the cured mortar to hydrothermal synthesis, so that zinc carbonate crystals in the cured mortar are converted to nano zinc oxide crystals.

Unless otherwise defined, all technical and scientific terms used herein (for example, "concrete", "coarse aggregate", "fine aggregate", "cement", "mortar", "hydration", and "water-cement ratio" or "W/C ratio") have the meaning commonly understood by a person skilled in the art to which this disclosure belongs.

Examples of the cement may be any type of cement used in the field of building materials, and include, but are not limited to, silicate cement. Examples of the fine aggregate may be any type of fine aggregate used in the field of building materials, and include, but are not limited to, quartz sand. Since the type and ratio of the fine aggregate and the cement in the mortar-producing material can by adjusted by those skilled in the art according to the workability requirement for the concrete, the detail thereof is omitted herein for the sake of brevity.

Examples of the microorganism-containing mixture include, but are not limited to, a liquid culture containing the urease-producing microorganism, a suspension containing the urease-producing microorganism, and a combination thereof. Since the type and preparation process of the microorganism-containing mixture fall within the routine skills and common knowledge of those skilled in the art, the detail thereof is omitted herein for the sake of brevity.

The term "urease-producing microorganism" refers to microorganisms capable of producing urease. Examples of the urease-producing microorganism include, but are not limited to, *Sporosarcina pasteurii* (also referred to as *Bacillus pasteurii*).

According to the present disclosure, the amount of the urea may be adjusted based on the amount of the microorganism-containing mixture. Furthermore, the amount of the microorganism-containing mixture may be adjusted based on the water-cement ratio (i.e. W/C ratio) of the mortar. Specifically, according to the workability requirement for concrete, the W/C ratio of the photocatalytic mortar to be produced is first determined. Then the ratio of the amount of the microorganism-containing mixture to that of the cement is calculated based on the W/C determined. Namely, the W/C ratio of the photocatalytic mortar to be produced is equal to the amount of the microorganism-containing mixture divided by the amount of the cement.

The term "zinc source" refers to a compound capable of providing zinc ions. Examples of the zinc source include, but are not limited to, zinc nitrate, a zinc nitrate hydrate, and a combination thereof. In certain embodiments, for the photocatalytic mortar to be produced to have a more satisfactory photocatalytic ability and a more satisfactory compressive strength, based on a total amount of the zinc source and the mortar-producing material (i.e. 100 wt %), an amount of the zinc source may range from 0.1 wt % to 20 wt %. In other embodiments, for the photocatalytic mortar to be produced to have an even more satisfactory photocatalytic ability and an even more satisfactory compressive strength, based on the total amount of the zinc source and the mortar-producing material, the amount of the zinc source may range from 0.5 wt % to 2.5 wt %.

The microbial induced precipitation may include the following steps. In the mortar-producing material, the urease-producing microorganism of the microorganism-containing mixture acts on the urea for the urea to undergo hydrolysis in the presence of water, such that carbonate ions and ammonium ions are formed. The carbonate ions and the zinc ions provided by the zinc source form carbonate salt crystals on the cell wall of the urease-producing microorganism, and the carbonate salt crystals precipitate.

The curing process can be conducted using techniques well-known to and commonly used by those skilled in the field of building materials for subjecting the cement to hydration. In certain embodiments, in the curing process, the zinc carbonate crystal-containing mortar is subjected to dry curing through exposure to the air at a temperature of 20±2° C. and a relative humidity of 70±2% for 7 to 28 days. In other embodiments, in the curing process, the zinc carbonate crystal-containing mortar is subjected to wet curing in tap water having a temperature of 23±2° C. for 7 to 28 days, for the photocatalytic mortar to be produced to have an even lower water absorption rate and an even stronger compressive strength.

In addition, according to the present disclosure, optionally, the zinc carbonate crystal-containing mortar may be placed in a mold to be molded before the curing process, and the molded zinc carbonate crystal-containing mortar is subsequently subjected to the curing process.

According to the present disclosure, the hydrothermal synthesis may be conducted in a supercritical environment or a subcritical environment. In certain embodiments, the hydrothermal synthesis is conducted at a temperature ranging from 60° C. to 150° C. and a pressure ranging from 1.2 $kg/cm^2$ to 3.0 $kg/cm^2$.

The present disclosure will be further described by way of the following examples. However, it should be understood that the following examples are intended solely for the purpose of illustration and should not be construed as limiting the present disclosure in practice.

Experimental Material:
1. Bacterial Liquid Culture 20 g of Yeast Extract (Becton, Dickinson and Company), 10 g of ammonium sulphate (J. T. Baker), 15.7482 g of Tris-base buffer salt (J. T. Baker), and 1000 mL of purified water were mixed evenly to form a culture medium. The culture medium was subjected to sterilization first using a high-temperature and high-pressure autoclave (TONIN; TM-328) under conditions of 1.5 $kg/cm^2$ and 121° C. for 20 minutes, and subsequently using an ultraviolet (UV) lamp for UV irradiation for 30 minutes. The resultant sterilized culture medium was allowed to cool down to 40° C., followed by adding thereinto *Sporosarcina pasteurii* (BCRC 11596; ATCC 11859) purchased from the Bioresource Collection and Research Center (BCRC) of the Food Industry Research and Development Institute (FIRDI) (Taiwan) and available from the American Type Culture Collection (ATCC) (U.S.A.). Cultivation was conducted in an incubator at 38° C. and 150 rpm. The bacterial cell count was conducted by measuring the absorbance at 600 nm ($OD_{600}$) using a spectrophotometer (Prema; PRO-739). When $OD_{600}$ reached 1.3, a satisfactory *Sporosarcina pasteurii* liquid culture was obtained. Such *Sporosarcina pasteurii* liquid culture was stored at 4° C. for further use.

1. PRODUCTION OF PHOTOCATALYTIC MORTAR OF EXAMPLES ACCORDING TO PRESENT DISCLOSURE AND THAT OF COMPARATIVE EXAMPLES

Photocatalytic mortar of examples of the present disclosure and that of comparative examples were produced as follows. Briefly speaking, Examples A1 to A5, B1 to B5, C1 to C5, and D1 to D5 and Comparative Examples A to D were produced through microbial induced precipitation, curing, and hydrothermal synthesis. Moreover, Comparative Examples E1 to E5 were produced by directly using nano zinc oxide power (i.e. not through microbial induced precipitation and hydrothermal synthesis for forming nano zinc oxide crystals) and curing.

1-1. Production of Example A1

81.78 g of white cement (Crown, Indonesia) (i.e. silicate cement) and 130 g of quartz sand (Prosperous Instrument Co. Ltd., Taiwan; Catalog. No. 5) with a particle size ranging from 0.5 mm to 1.5 mm were evenly mixed to form a mortar-producing material.

1.0589 g of zinc nitrate hexahydrate (J.T. Baker) and 3.24 g of urea (Choneye Pure Chemicals, Taiwan) were evenly mixed to form a reactant mixture. The reactant mixture was evenly dispersed in the mortar-producing material, followed by adding 49.068 g of the *Sporosarcina pasteurii* liquid culture described in the Experimental Material and evenly mixing, such that the reactant mixture and the *Sporosarcina pasteurii* liquid culture underwent microbial induced precipitation to form zinc carbonate crystals in the mortar-producing material. Accordingly, zinc carbonate crystal-containing mortar was obtained.

The zinc carbonate crystal-containing mortar was placed in a mold (50 mm×50 mm×50 mm), followed by being left standing at room temperature for three days. The molded mortar was subjected to dry curing through exposure to the air at a temperature of 20±2° C. and a relative humidity of 70±2% for 7 days. The cured mortar was placed in a high-temperature and high-pressure autoclave, followed by adding reverse osmosis water into the autoclave, so that the cured mortar was subjected to hydrothermal synthesis at a temperature of 121° C. and a pressure of 1.5 kg/cm$^2$ for 6 hours. Therefore, the zinc carbonate crystals in the cured mortar were converted to nano zinc oxide crystals. Photocatalytic mortar containing nano zinc oxide crystals (i.e. Example A1) was obtained.

1-2. Production of Examples A2 to A5

Examples A2 to A5 were produced generally according to the procedure described in subsection 1-1 above, except that Examples A2 to A5 were produced respectively using 2.1178 g of zinc nitrate hexahydrate, 3.1767 g of zinc nitrate hexahydrate, 4.2356 g of zinc nitrate hexahydrate, and 5.2945 g of zinc nitrate hexahydrate.

1-3. Production of Examples B1 to B5, C1 to C5, and D1 to D5

Examples B1 to B5 were produced in manners respectively similar to those for producing Examples A1 to A5, Examples C1 to C5 were produced in manners respectively similar to those for producing Examples A1 to A5, and Examples D1 to D5 were produced in manners respectively similar to those for producing Examples A1 to A5, except for the following differences. Examples B1 to B5 were produced by subjecting the molded mortar to dry curing through exposure to the air at a temperature of 20±2° C. and a relative humidity of 70±2% for 28 days. Examples C1 to C5 were produced by subjecting the molded mortar to wet curing in tap water having a temperature of 23±2° C. for 7 days. Examples D1 to D5 were produced by subjecting the molded mortar to wet curing in tap water having a temperature of 23±2° C. for 28 days.

1-4. Production of Comparative Examples A to D

Comparative Example A was produced in a manner similar to those for producing Examples A1 to A5, Comparative Example B was produced in a manner similar to those for producing Examples B1 to B5, Comparative Example C was produced in a manner similar to those for producing Examples C1 to C5, and Comparative Example D was produced in a manner similar to those for producing Examples D1 to D5, except that the amount of zinc nitrate hexahydrate used was 0 g (i.e. no zinc nitrate hexahydrate was used).

1-5. Production of Comparative Example E1

81.78 g of white cement (Crown, Indonesia) (i.e. silicate cement) and 130 g of quartz sand (Prosperous Instrument Co. Ltd., Taiwan; Catalog. No. 5) with a particle size ranging from 0.5 mm to 1.5 mm were evenly mixed to form a mortar-producing material. 49.068 g of water and 1.0589 g of nano zinc oxide powder (Long Ton Co., Ltd., Taiwan; Catalog No. WU-ZnO-001) with an average particle size of 20 nm and purity of 99.9% were added to the mortar-producing material, followed by evenly mixing, so as to form mortar containing nano zinc oxide powder.

The mortar containing zinc oxide powder was placed in a mold (50 mm×50 mm×50 mm), followed by being left standing at room temperature for three days. The molded mortar was subjected to wet curing in tap water having a temperature of 23±2° C. for 28 days. Therefore, photocatalytic mortar of Comparative Example E1 was obtained.

1-6. Production of Comparative Examples E2 to E5

Comparative Examples E2 to E5 were produced generally according to the procedure described in subsection 1-5 above, except that Comparative Examples E2 to E5 were produced respectively using 2.1178 g of nano zinc oxide powder, 3.1767 g of nano zinc oxide powder, 4.2356 g of nano zinc oxide powder, and 5.2945 g of nano zinc oxide powder.

2. CHARACTERISTIC ASSESSMENT

2-1. X-Ray Diffraction (XRD) Analysis

Figure 2:
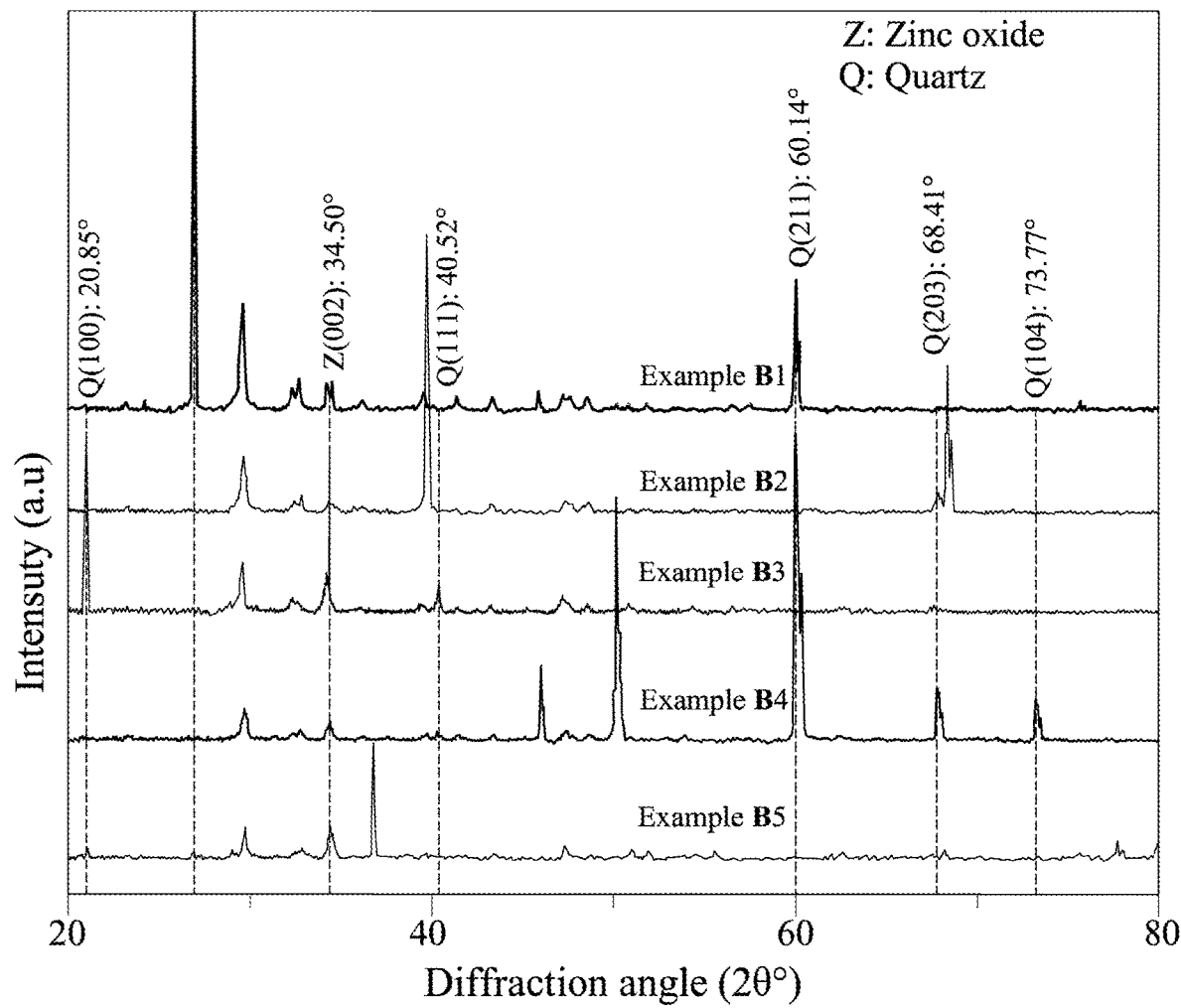
FIG. 2 shows X-ray diffractograms of photocatalytic mortar of Examples B1 to B5.
Figure 3:
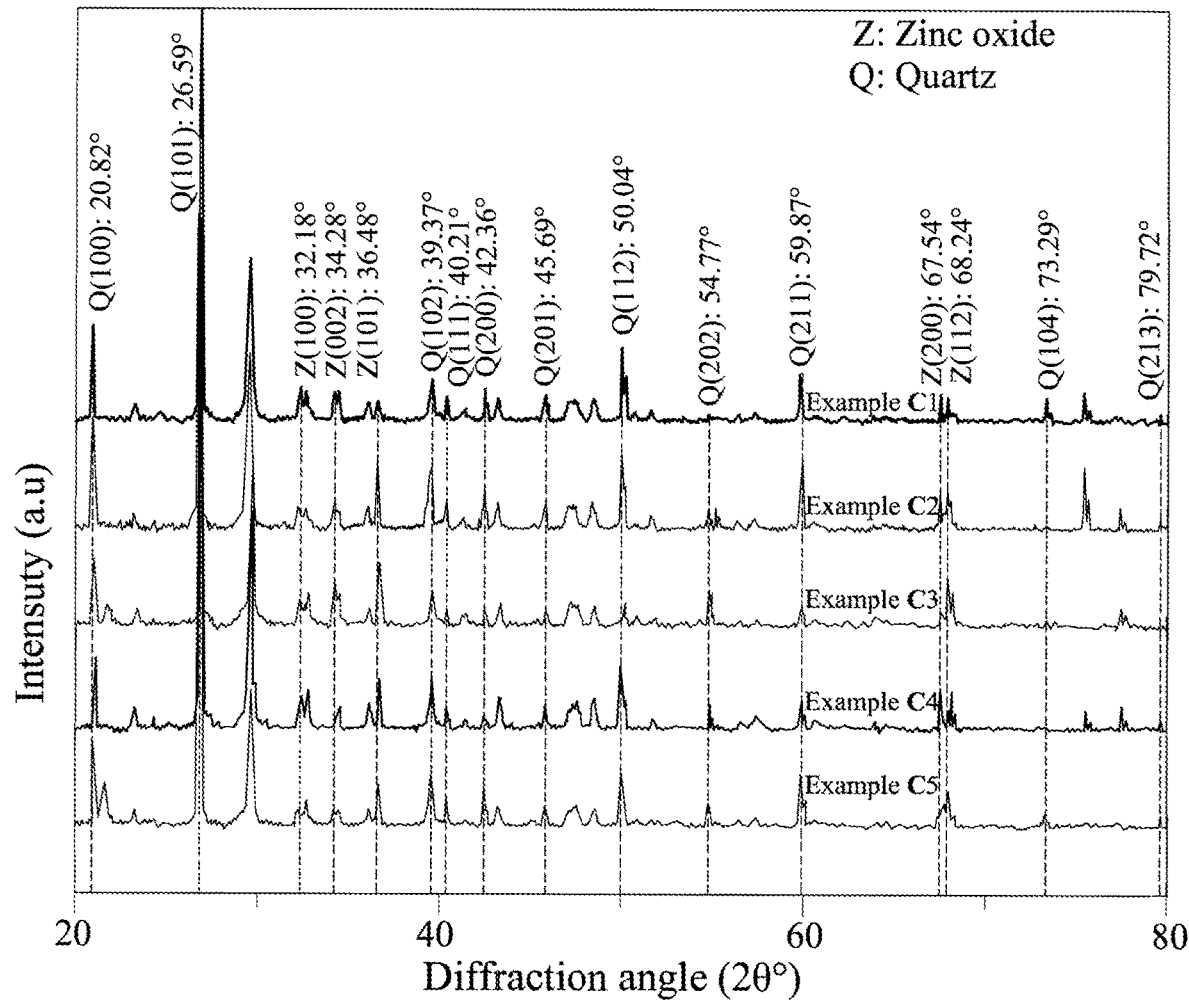
FIG. 3 shows X-ray diffractograms of photocatalytic mortar of Examples C1 to C5.
Figure 4:
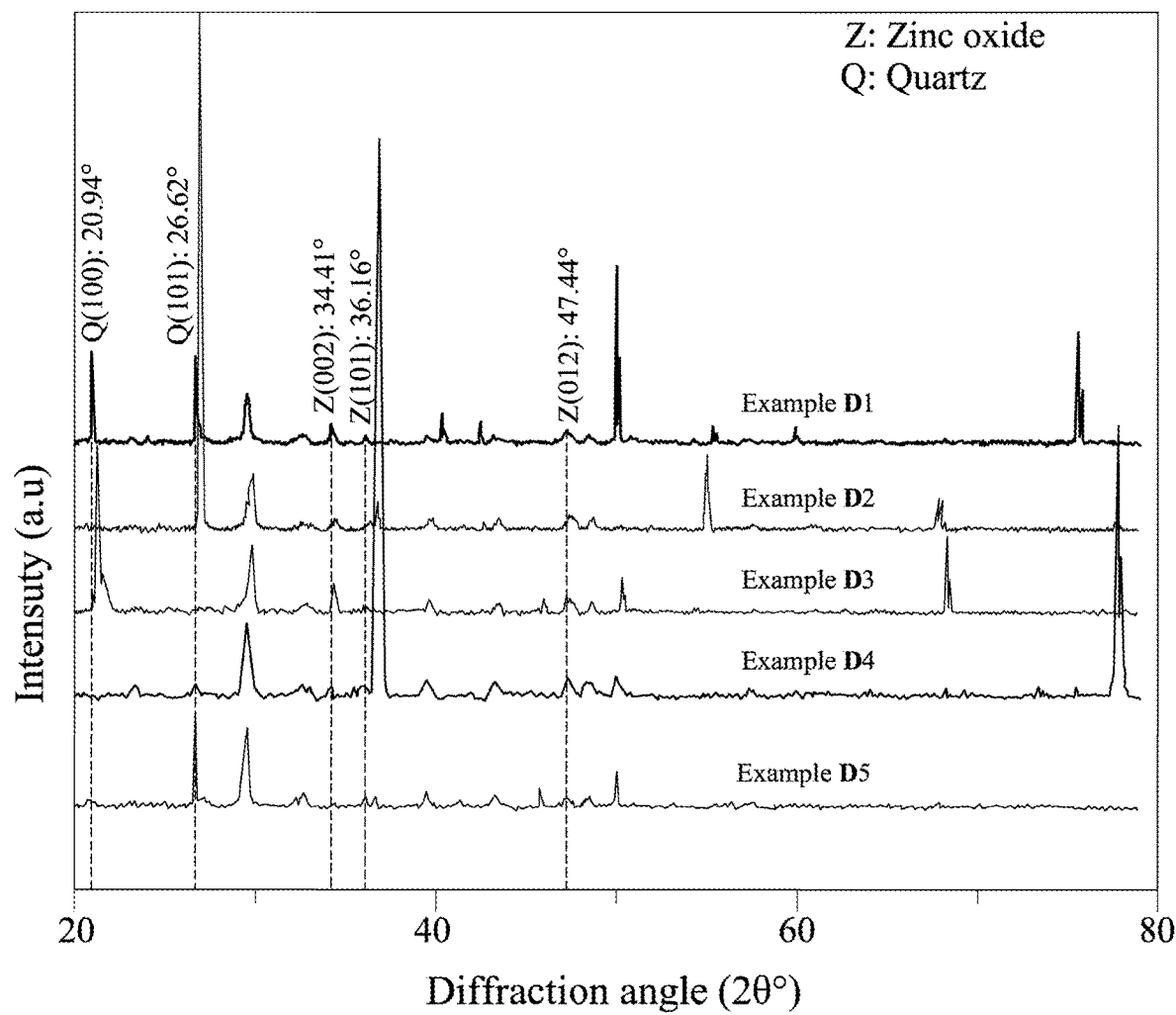
FIG. 4 shows X-ray diffractograms of photocatalytic mortar of Examples D1 to D5.

The photocatalytic mortar of Examples A1 to A5, B1 to B5, C1 to C5, and D1 to D5 was subjected to XRD analysis using an X-ray diffractometer (Shimadzu, XRD-6000). The X-ray diffractograms of the examples thus obtained are respectively shown in FIGS. 1 to 4.

2-2. Scanning Electron Microscopy (SEM) Analysis

Figure 5:
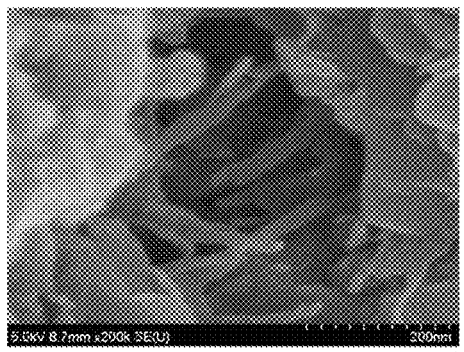
FIG. 5 shows field emission scanning electron microscope (FE-SEM) images of the photocatalytic mortar of Examples A1 to A5 and that of photocatalytic mortar of Comparative Example A.
Figure 5:
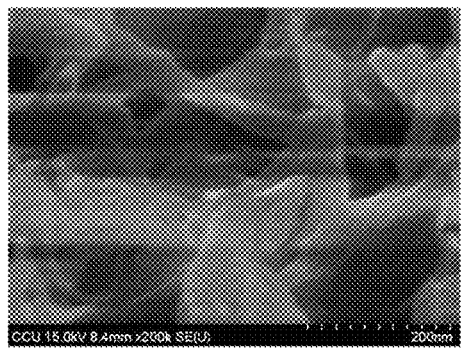
Figure 5:
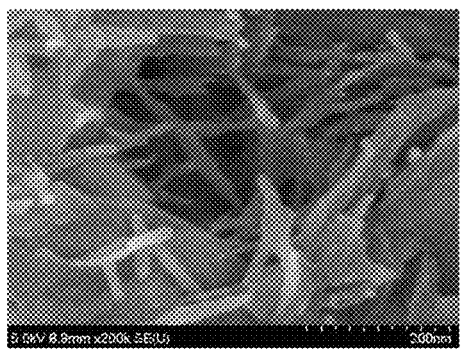
Figure 5:
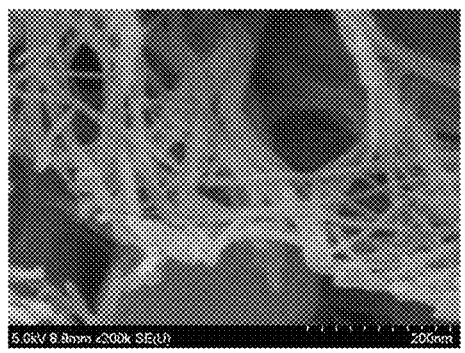
Figure 5:
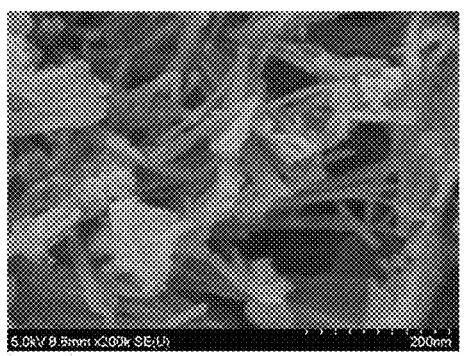
Figure 5:
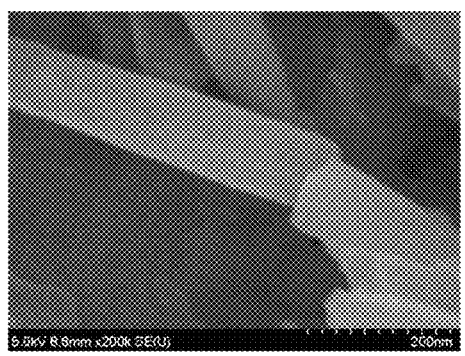
Figure 6:
FIG. 6 shows FE-SEM images of the photocatalytic mortar of Examples B1 to B5 and that of photocatalytic mortar of Comparative Example B.
Figure 6:
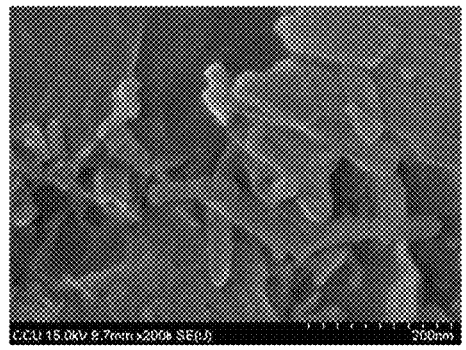
Figure 6:
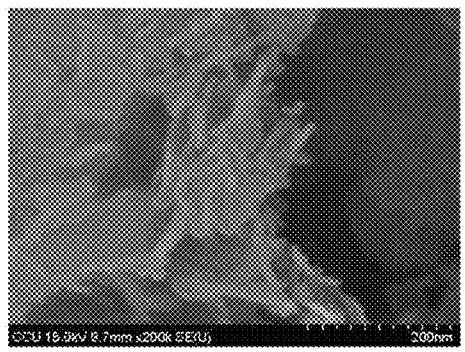
Figure 6:
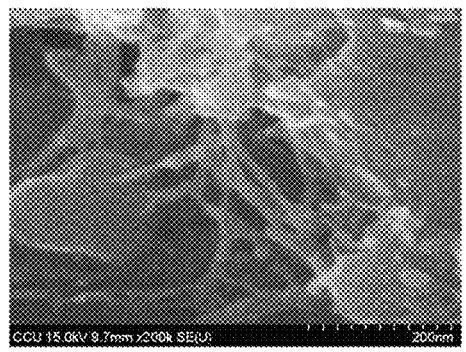
Figure 6:
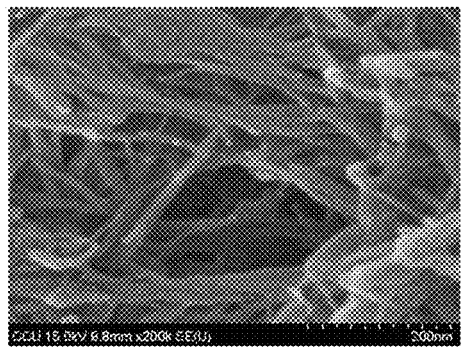
Figure 6:
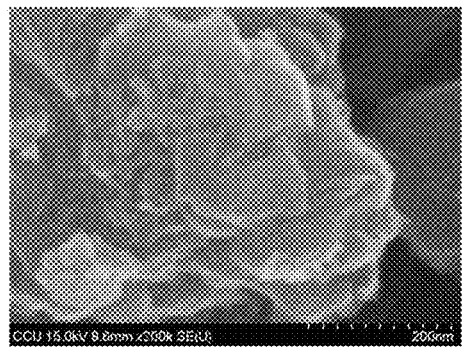
Figure 7:
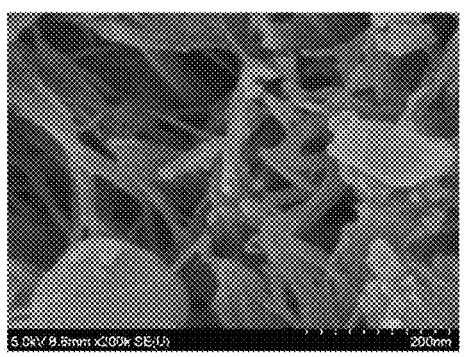
FIG. 7 shows FE-SEM images of the photocatalytic mortar of Examples C1 to C5 and that of photocatalytic mortar of Comparative Example C.
Figure 7:
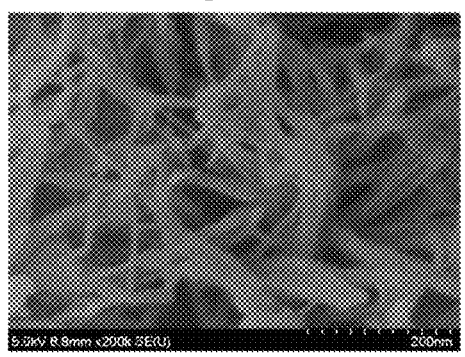
Figure 7:
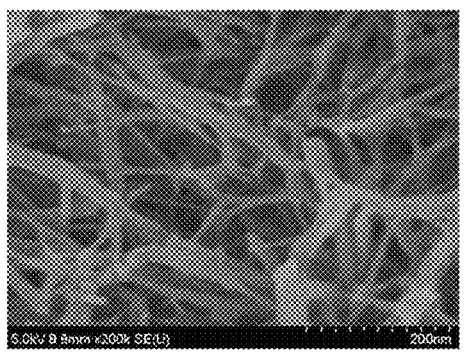
Figure 7:
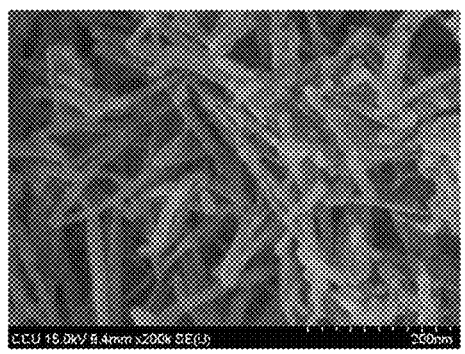
Figure 7:
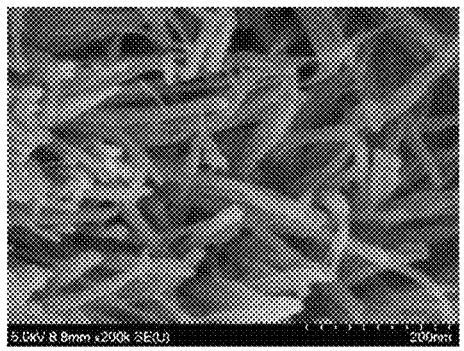
Figure 7:
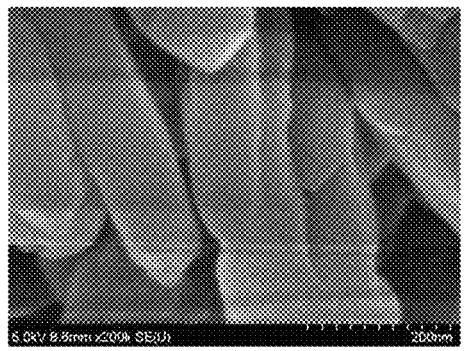
Figure 8:
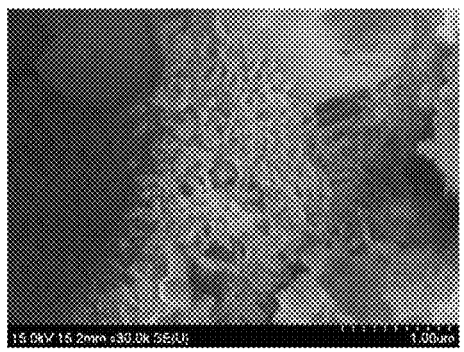
FIG. 8 shows FE-SEM images of the photocatalytic mortar of Examples D1 to D5 and that of photocatalytic mortar of Comparative Example D.
Figure 8:
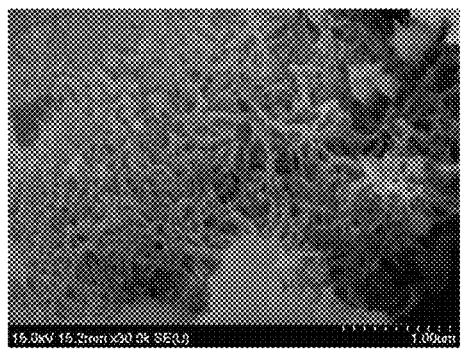
Figure 8:
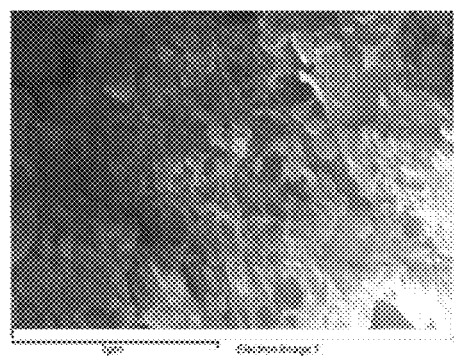
Figure 8:
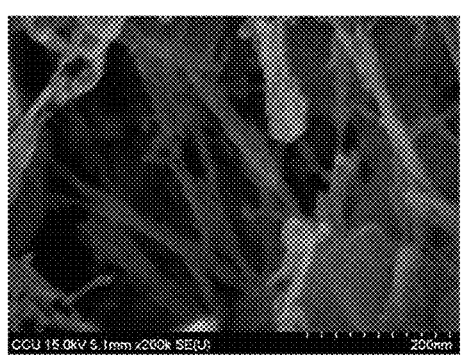
Figure 8:
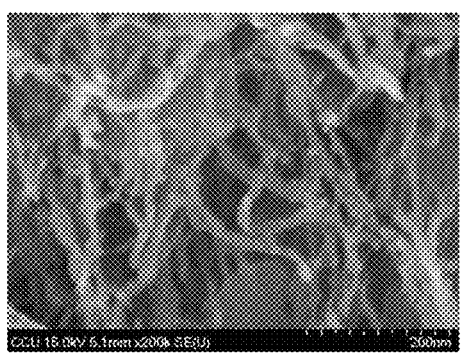
Figure 8:
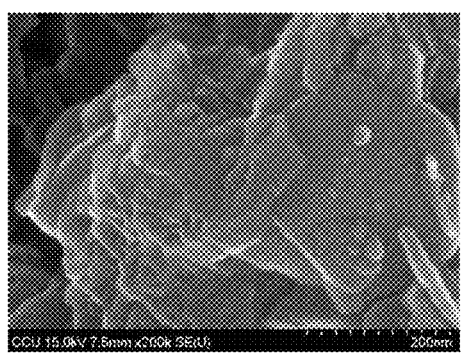

The photocatalytic mortar of Examples A1 to A5, B1 to B5, C1 to C5, and D1 to D5 and Comparative Examples A to D was subjected to analysis of characteristic three-dimensional appearance using a field emission scanning electron microscope (FE-SEM) (Hitachi, S4800-I). Specifically, before the respective photocatalytic mortar was subjected to the SEM analysis, the following pretreatment was performed: the powder of the respective photocatalytic mortar was attached to the specimen holder of the FE-SEM through a carbon conductive tape;

the specimen holder with the powder was placed in an oven to be heated at 100° C. for 1 hour, so as to remove the water in the powder of the respective photocatalytic mortar; and the specimen holder with the powder was placed on a coater so as to coat the powder with gold for 60 seconds. The FE-SEM images obtained are respectively shown in FIGS. 5 to 8.

2-3. Determination of Water Absorption Rate

The photocatalytic mortar of each of the examples and comparative examples was placed in an oven to be heated at 110° C. so as to remove the water in the photocatalytic mortar, and the photocatalytic mortar was taken out from the oven every 24 hours and subjected to weight measurement. When the photocatalytic mortar had a weight change less than 0.5%, the same was considered to have a constant weight, and such weight was recorded as the dry weight of the photocatalytic mortar.

The photocatalytic mortar with the constant weight was immersed in water at 21° C. for 48 hours, and was taken out from water, followed by wiping the surface of the photocatalytic mortar to dry the same.

The photocatalytic mortar was subjected to weight measurement, and the weight thus measured was recorded as the wet weight of the photocatalytic mortar. The water absorption rate (%) was calculated using the following Equation (I):

$$A=[(B-C)/C]\times 100 \quad (I)$$

where A=water absorption rate (%)
B=wet weight of respective photocatalytic mortar
C=dry weight of respective photocatalytic mortar The result is shown in Table 1 below.

2-4. Determination of Contact Angle

The photocatalytic mortar of a respective one of Examples D1 to D5 and Comparative Example D was placed on a sample stage of a contact angle meter (Creating Nano Technologies, Taiwan; CAM-100), followed by forming a water drop on the surface of the photocatalytic mortar. The contact angle formed by the water drop, i.e. the angle formed between the surface of the photocatalytic mortar and the line tangent to the edge of the water drop, was measured using the contact angle meter. The result is shown in Table 1 below.

2-5. Determination of Compressive Strength

The photocatalytic mortar of each of the examples and comparative examples was subjected to determination of compressive strength using 25-ton CLSM Computer Servo Control Compression Testing Machine (Yenstron Corp., Taiwan; YS/7000-LA25T) according to CNS 1010 R3032, i.e. Method of Test for Compressive Strength of Hydraulic Cement Mortars. The result is shown in Table 2 below.

2-6. Determination of Photocatalytic Efficiency

The photocatalytic mortar of Examples B1 to B5 and D1 to D5 and Comparative Examples B, D, and E1 to E5 was subjected to determination of photocatalytic efficiency as follows.

A test piece of the respective photocatalytic mortar (50 mm×50 mm×10 mm) and an aqueous methylene blue solution having a methylene blue concentration of 10 ppm were allowed to undergo a photocatalytic reaction for 750 minutes under PR-4000 Photochemical Reactor (Panchum Scientific Corp., Taiwan) equipped with 6257 Xenon Arc Lamp (Oriel Instruments; wattage: 100 W) serving as the only light source, such that the methylene blue in the aqueous methylene blue solution was degraded. Subsequently, the methylene blue concentration of the aqueous methylene blue solution was measured. The photocatalytic efficiency (η %) of the respective photocatalytic mortar was calculated using the following equation (II):

$$D=[(E-F)/E]\times 100 \quad (II)$$

where D=photocatalytic efficiency (η %)
E=methylene blue concentration in aqueous methylene blue solution before photocatalytic reaction
F=methylene blue concentration in aqueous methylene blue solution after photocatalytic reaction The result is shown in Table 2 below.

Results:

TABLE 1

|  |  | Type and time of curing | Amount of Zinc source in wt %* | Water absorption rate (%) | Contact angle (degree) |
|---|---|---|---|---|---|
| Example | A1 | 7 days of dry curing | 0.5 | 12.25 | - - - |
|  | A2 |  | 1 | 12.55 |  |
|  | A3 |  | 1.5 | 11.85 |  |
|  | A4 |  | 2 | 11.65 |  |
|  | A5 |  | 2.5 | 10.85 |  |
|  | B1 | 28 days of dry curing | 0.5 | 11.53 | - - - |
|  | B2 |  | 1 | 11.54 |  |
|  | B3 |  | 1.5 | 11.33 |  |
|  | B4 |  | 2 | 10.93 |  |
|  | B5 |  | 2.5 | 10.73 |  |
|  | C1 | 7 days of wet curing | 0.5 | 11.57 | - - - |
|  | C2 |  | 1 | 10.54 |  |
|  | C3 |  | 1.5 | 9.44 |  |
|  | C4 |  | 2 | 9.31 |  |
|  | C5 |  | 2.5 | 8.55 |  |
|  | D1 | 28 days of wet curing | 0.5 | 10.45 | 53.89 |
|  | D2 |  | 1 | 9.92 | 65.93 |
|  | D3 |  | 1.5 | 8.9 | 71.26 |
|  | D4 |  | 2 | 8.24 | 80.87 |
|  | D5 |  | 2.5 | 7.39 | 89.54 |
| Comparative Example | A | 7 days of dry curing | 0 | 13.15 | - - - |
|  | B | 28 days of dry curing | 0 | 11.75 | - - - |
|  | C | 7 days of wet curing | 0 | 12.38 | - - - |
|  | D | 28 days of wet curing | 0 | 11.15 | 35.61 |
|  | E1 | 28 days of wet curing | 0.5 | 15.44 | - - - |
|  | E2 |  | 1 | 15.34 |  |
|  | E3 |  | 1.5 | 14.20 |  |
|  | E4 |  | 2 | 12.45 |  |
|  | E5 |  | 2.5 | 13.64 |  |

- - -: not determined
*Amount of zinc source in wt % = [amount of zinc source in gram/(amount of mortar-producing material in gram + amount of zinc source in gram)] × 100

TABLE 2

|  |  | Compression strength (kgf/cm²) | Photocatalytic efficiency (η %) |
|---|---|---|---|
| Example | A1 | 285.69 | - - - |
|  | A2 | 278.15 |  |
|  | A3 | 200.99 |  |
|  | A4 | 273.19 |  |
|  | A5 | 253.75 |  |
|  | B1 | 334.84 | 47.13 |
|  | B2 | 308.2 | 63.92 |
|  | B3 | 282.35 | 70.18 |
|  | B4 | 278.28 | 74.50 |
|  | B5 | 269.71 | 78.96 |
|  | C1 | 305.64 | - - - |
|  | C2 | 317.11 |  |

TABLE 2-continued

|  |  | Compression strength (kgf/cm$^2$) | Photocatalytic efficiency ($\eta$ %) |
|---|---|---|---|
|  | C3 | 329.33 |  |
|  | C4 | 329.93 |  |
|  | C5 | 295.61 |  |
|  | D1 | 378.53 | 48.97 |
|  | D2 | 352.19 | 65.35 |
|  | D3 | 340.07 | 72.54 |
|  | D4 | 332.14 | 76.42 |
|  | D5 | 318.38 | 79.95 |
| Comparative Example | A | 357.6 | - - - |
|  | B | 416.69 | 37.74 |
|  | C | 501.01 | - - - |
|  | D | 508.89 | 39.43 |
|  | E1 | 346.36 | 42.13 |
|  | E2 | 359.59 | 45.20 |
|  | E3 | 297.43 | 52.43 |
|  | E4 | 92.53 | 56.43 |
|  | E5 | 44.55 | 59.53 |

- - -: not determined

2-1. XRD Analysis

Referring to FIGS. 1 to 4, regarding the photocatalytic mortar of each of the examples, the characteristic peak of zinc oxide crystal was observed in the X-ray diffractogram, proving that the photocatalytic mortar produced by the method of the present disclosure has nano zinc oxide crystals.

2-2. SEM Analysis

Referring to FIGS. 5 to 8, the FE-SEM image of the photocatalytic mortar of each of Comparative Examples A to D does not show zinc oxide crystals, while the FE-SEM image of the photocatalytic mortar of each of the examples shows nano zinc oxide crystals that are needle-shaped, filamentous, tubular, or weblike, indicating that the photocatalytic mortar produced by the method of the present disclosure has nano zinc oxide crystals. In addition, by comparing the FE-SEM images of Examples A1 to A5 (produced through 7 days of dry curing) with those of Examples C1 to C5 (produced through 7 days of wet curing), and by comparing the FE-SEM images of Examples B1 to B5 (produced through 28 days of dry curing) with those of Examples D1 to D5 (produced through 28 days of wet curing), it can be observed that the photocatalytic mortar produced through wet curing contains more compact nano zinc oxide crystals compared to that produced through dry curing.

2-3. Determination of Water Absorption Rate

Turning to Table 1, by comparing Examples A1 to A5 (produced through 7 days of dry curing) with Comparative Example A (also produced through 7 days of dry curing), it can be observed that the water absorption rate of the photocatalytic mortar of Examples A1 to A5 was lower than that of the photocatalytic mortar of Comparative Example A. Furthermore, the lowering in water absorption rate was also observed based on the comparison of Examples B1 to B5 with Comparative Example B, that of Examples C1 to C5 with Comparative Example C, and that of Examples D1 to D5 with Comparative Example D. Namely, only by using a zinc source in producing photocatalytic mortar, the photocatalytic mortar produced through the same curing process can have a satisfactory water absorption rate.

In addition, by comparing Comparative Examples E1 to E5 respectively with Examples D1 to D5, it can be observed that when the same amount of zinc source in wt % was applied, the water absorption rate of the photocatalytic mortar of the respective example (produced using a microorganism-containing mixture for forming nano zinc oxide crystals) was lower than that of the photocatalytic mortar of the corresponding comparative example (produced directly using nano zinc oxide crystals). Namely, only by using a zinc source and a microorganism-containing mixture acting thereon to form nano zinc oxide crystals, the photocatalytic mortar produced through the same curing process can have a satisfactory water absorption rate.

2-4. Determination of Contact Angle

Referring to Table 1, the contact angle of the photocatalytic mortar of each of Examples D1 to D5 was larger than that of the photocatalytic mortar of Comparative Example D, indicating that the photocatalytic mortar of each of Examples D1 to D5 had stronger hydrophobicity. In particular, the contact angle of the photocatalytic mortar of each of Examples D4 and D5 was larger than 80°.

In view of the results of subsections 2-3 and 2-4, it can be verified that the photocatalytic mortar produced by the method of the present disclosure has a satisfactorily low water absorption rate and a satisfactorily strong hydrophobicity, manifesting that such photocatalytic mortar, when used to produce concrete, can prevent water from penetrating into the concrete structure.

2-5. Determination of Compressive Strength

Referring to Table 2, based on the comparison of Comparative Examples E1 to E5 with Examples D1 to D5, even though the increase in the amount of zinc source in wt % reduced the compressive strength of the photocatalytic mortar, in terms of the largest degree of increase in the amount of zinc source in wt % (from 0.5 wt % to 2.5 wt %), the largest degree of reduction in compressive strength regarding Examples D1 to D5 was only 16% (i.e. (378.53−318.38)÷378.53×100=16%) and was significantly less than that regarding Comparative Examples E1 to E5 which was 87% (i.e. (346.36−44.55)÷346.36×100=87%).

2-6. Determination of Photocatalytic Efficiency

Referring to Table 2, based on the comparison of Examples B1 to B5 with Comparative Example B, and that of Examples D1 to D5 with Comparative Example D, it can be observed that only by using a zinc source in producing photocatalytic mortar, the photocatalytic mortar produced through the same curing process can have satisfactory photocatalytic efficiency.

In addition, based on the comparison of Comparative Examples E1 to E5 with Examples D1 to D5, even though the increase in the amount of zinc source in wt % could enhance the photocatalytic efficiency of the photocatalytic mortar, in terms of the largest degree of increase in the amount of zinc source in wt % (from 0.5 wt % to 2.5 wt %), the largest degree of increase in photocatalytic efficiency regarding Examples D1 to D5 was 63% (i.e. (79.95−48.97)÷48.97×100=63%) and was significantly higher than that regarding Comparative Examples E1 to E5 which was only 41% (i.e. (59.53−42.13)÷42.13×100=41%).

In view of the results of subsections 2-5 and 2-6, even though the conventional production method, which directly employs nano zinc oxide powder for producing photocatalytic mortar, can enhance the photocatalytic efficiency of the photocatalytic mortar produced to a certain extent, the conventional production method greatly reduces the compressive strength of the photocatalytic mortar. However, the production method of the present disclosure, which applies a microorganism-containing mixture to form nano zinc oxide crystals for producing photocatalytic mortar, not only can enhance the photocatalytic efficiency of the photocatalytic mortar produced to a satisfactorily large extent, but also can minimize the decrease in the compressive strength of the photocatalytic mortar produced when the amount of zinc source is increased.

In the description above, for the purposes of explanation, numerous specific details have been set forth in order to provide a thorough understanding of the embodiments. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what are considered the exemplary embodiments, it is understood that this disclosure is not limited to the disclosed embodiments but is intended to cover various arrangements included within the spirit and scope of the broadest interpretation so as to encompass all such modifications and equivalent arrangements.

What is claimed is:

1. A method for producing photocatalytic mortar, comprising:
    providing a mortar-producing material that includes a fine aggregate and cement, a reactant mixture that includes a zinc source and urea, and a microorganism-containing mixture that includes water and a urease-producing microorganism;
    subjecting the microorganism-containing mixture and the reactant mixture to microbial induced precipitation in the mortar-producing material, so as to obtain zinc carbonate crystal-containing mortar;
    subjecting the zinc carbonate crystal-containing mortar to a curing process, so that the zinc carbonate crystal-containing mortar undergoes hydration to form cured mortar; and
    subjecting the cured mortar to hydrothermal synthesis, so that zinc carbonate crystals in the cured mortar are converted to nano zinc oxide crystals, so as to obtain the photocatalytic mortar containing the nano zinc oxide crystals.

2. The method as claimed in claim 1, wherein based on a total weight of the zinc source and the mortar-producing material, an amount of the zinc source ranges from 0.1 wt % to 20 wt %.

3. The method as claimed in claim 1, wherein based on a total weight of the zinc source and the mortar-producing material, an amount of the zinc source ranges from 0.5 wt % to 2.5 wt %.

4. The method as claimed in claim 1, wherein in the curing process, the zinc carbonate crystal-containing mortar is subjected to dry curing through exposure to air at a temperature of 20±2° C. and a relative humidity of 70±2% for 7 to 28 days.

5. The method as claimed in claim 1, wherein in the curing process, the zinc carbonate crystal-containing mortar is subjected to wet curing in tap water having a temperature of 23±2° C. for 7 to 28 days.

6. The method as claimed in claim 1, wherein the hydrothermal synthesis is conducted at a temperature ranging from 60° C. to 150° C. and a pressure ranging from 1.2 kg/cm2 to 3.0 kg/cm2.

7. The method as claimed in claim 1, wherein the urease-producing microorganism is *Sporosarcina Pasteurii*.

8. The method as claimed in claim 1, wherein the cement is silicate cement.

9. The method as claimed in claim 1, wherein the fine aggregate is quartz sand.

10. The method as claimed in claim 1, wherein the zinc source is selected from the group consisting of zinc nitrate, a zinc nitrate hydrate, and a combination thereof.

11. The method as claimed in claim 1, wherein the microorganism-containing mixture is selected from the group consisting of a liquid culture containing the urease-producing microorganism, a suspension containing the urease-producing microorganism, and a combination thereof.

* * * * *